No. 725,218. PATENTED APR. 14, 1903.
R. N. CHAMBERLAIN.
STORAGE BATTERY.
APPLICATION FILED AUG. 13, 1902.
NO MODEL. 2 SHEETS—SHEET 1.
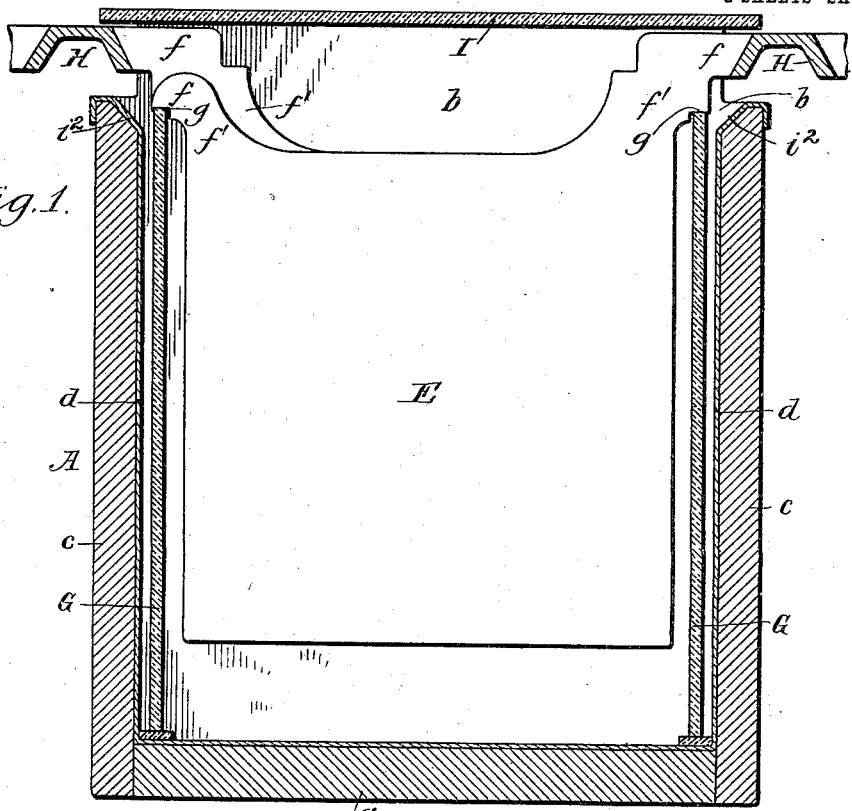
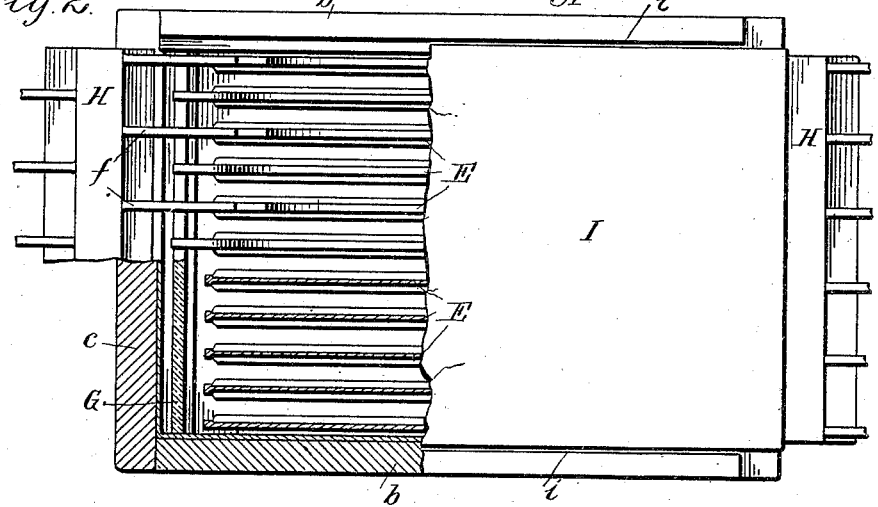

No. 725,218. PATENTED APR. 14, 1903.
R. N. CHAMBERLAIN.
STORAGE BATTERY.
APPLICATION FILED AUG. 13, 1902.
NO MODEL. 2 SHEETS—SHEET 2.
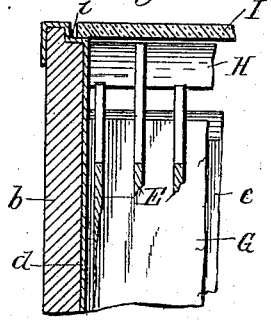
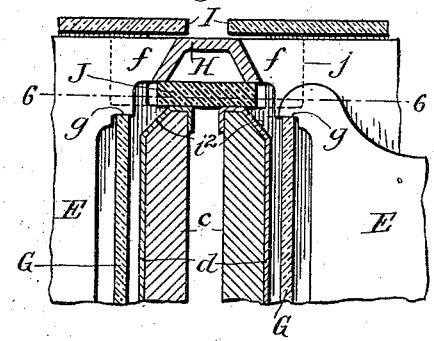
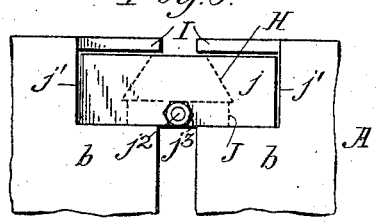
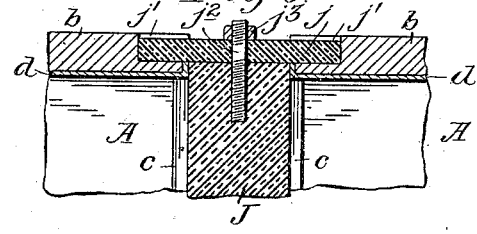
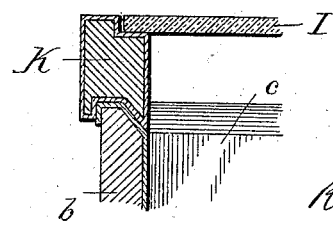

UNITED STATES PATENT OFFICE.

RUFUS N. CHAMBERLAIN, OF DEPEW, NEW YORK, ASSIGNOR TO GOULD STORAGE BATTERY COMPANY, OF NEW YORK, N. Y., A CORPORATION OF WEST VIRGINIA.

STORAGE BATTERY.

SPECIFICATION forming part of Letters Patent No. 725,218, dated April 14, 1903.

Application filed August 13, 1902. Serial No. 119,525. (No model.)

*To all whom it may concern:*

Be it known that I, RUFUS N. CHAMBERLAIN, a citizen of the United States, residing at Depew, in the county of Erie and State of New York, have invented new and useful Improvements in Storage Batteries, of which the following is a specification.

This invention relates to that class of electric storage batteries in which the tanks, jars, or receptacles which contain the lead plates or grids are provided with covers.

The hydrogen and oxygen which are formed in the electrolyte of a cell by the decomposition of the water in the solution escape from the electrolyte in the form of bubbles, which carry with them a slight amount of the electrolyte. In a covered cell these bubbles rise and, striking the cover, burst and deposit the moisture or electrolyte on the under face of the cover, while the gases escape through the vents of the cell in a nearly clear or dry form. If the moisture which thus collects on the cover is returned to the electrolyte in the cell, a great saving of the electrolyte and an increased efficiency of the cell result.

The object of the invention is to provide a covered tank, jar, or receptacle of simple and inexpensive construction which will effectually prevent the wasting of the electrolyte by evaporation, will return the escaping moisture to the electrolyte, will prevent the formation on the cover of an acid conductor across the battery plates or cells, and will afford easy access to the cell for the purpose of taking hydrometer and temperature readings or for other reasons.

In the accompanying drawings, consisting of two sheets, Figure 1 is a vertical section through a battery-cell embodying the invention. Fig. 2 is a plan view thereof, the cover and one corner of the tank being broken away. Fig. 3 is a fragmentary section through the upper portion of one end wall and the adjacent portion of the cover. Fig. 4 is a fragmentary section of the upper parts of two adjacent cells. Fig. 5 is a fragmentary end elevation of the upper parts of the two adjacent cells. Fig. 6 is a fragmentary horizontal section in line 6 6, Fig. 4, the battery-plates being removed. Fig. 7 is a fragmentary section showing a modified construction of the end wall.

Like letters of reference refer to like parts in the several figures.

The tank, jar, or receptacle A comprises a bottom $a$, end walls $b$, and side walls $c$. The tank may be constructed of any suitable material, such as lead-lined wood, glass, or earthenware. The tank shown in the drawings is of the kind employed in large stationary batteries and is formed of wood provided with the usual lead lining $d$.

E represents the lead plates or grids, which are of any usual or suitable construction and provided at their upper ends with laterally-projecting necks $f$, connected with the plates by upwardly-projecting shanks $f'$. These plates are arranged side by side in the tank parallel with the end walls thereof and in the construction shown are supported in this relation by vertical plates G, of suitable insulating material, preferably glass, which are arranged in the tank adjacent to the side walls thereof. The necks or shanks of the plates or grids are provided with shoulders $g$, which rest on the top edges of the glass plates G. The necks of the plates or grids extend laterally outward over the upper edges of the side walls of the tank, but do not rest on or contact with said walls.

H represents the "bus-bars" or bars which connect the alternate plates. They are arranged over the upper edges of the side walls of the tank, the bus-bar on one side connecting the adjacent necks of the alternate plates, while the other bus-bar connects the adjacent necks of the remaining plates in the usual manner. The opposite longitudinal sides of the bus-bars are beveled or diverge downwardly.

The end walls $c$ of the tank extend vertically upward above the horizontal plane of the upper edges of the side walls of the tank to form supports for the cover. The latter, which is shown at I, is in the form of a flat plate of acid-proof material, preferably glass, which enables the inspection of the contents and action of the cell without necessitating the removal of the cover. The cover is removably supported at its opposite ends in rabbets i, provided in the upper edges of the end walls. The bottoms of the rabbets are on such a horizontal plane that the cover supported thereby is held above or out of contact with the necks of the plates or grids and the bus-bars. The side edges of the cover preferably overhang the bus-bars. This arrangement of the cover prevents the moisture which collects on the under side of the cover from connecting the plates and forming an acid conductor across the plates or grids. Any moisture which runs from the end portions of the cover is caught by the rabbets and returned into the tank, while that from the sides of the cover drips onto the bus-bars and runs down the beveled sides thereof back into the tank. To assist in returning the electrolyte, the upper edges of the side walls of the tank are preferably beveled at $i^2$, Fig. 1. With the tank constructed as described the escape of the acid-laden gases from the cell is largely prevented, thus avoiding waste of the electrolyte and necessary replenishing, the reduction of the temperature of the solution by evaporation, and a consequent lessened capacity and the deterioration of adjacent parts due to the action of acid vapors.

As in batteries the cells are arranged side by side, there is little likelihood of side drafts on the cells and very little or no vapor passes out with the escaping gases through the open spaces formed between the plates or grids above the upper edges of the side walls. These spaces may, however, be closed by providing the filling-strips J. (Shown in Figs. 4 to 6.) One of these strips is placed on the edges of the adjacent side walls of two adjoining tanks beneath the bus-bar. The filling-strips are made of insulating acid-proof material—such, for instance, as paraffined wood, hard rubber, or porcelain. The filling-strip is held from endwise displacement by end blocks j, of analogous material, which are arranged outside of the ends of the bus-bar in seats j' provided for them in the end walls of the tanks and connected to the filling-strip by bolts $j^2$ and nuts $i^3$ of acid-proof material. In this construction the end blocks close the spaces between the end walls of the tanks and the filling-strip closes the space between the bus-bar and the upper edges of the side walls of the tanks, so that only the very narrow spaces between the tops of the bus-bars and covers are left and the vapors will not escape through these spaces.

In the form of the tank shown in Figs. 1 to 6 the end walls are made in one piece. It is obvious, however, that the end walls could be made up of sections. In the construction shown in Fig. 7 an ordinary tank is employed in which the side walls and lower portions of the end walls are of the same height, the necessary extension of each end wall above the side walls being secured by an upper end wall section K, which is detachably held on the upper edge of the lower section of the end wall. As shown, the upper section is provided in its lower edge with a groove, in which the upper edge of the lower section engages. The upper section may be made of lead-lined wood or other acid-proof or protected material.

I claim as my invention—

1. The combination with a tank or receptacle provided with a bottom, side walls, and end walls which extend upwardly above the tops of the side walls, of battery-plates arranged in said tank or receptacle and provided with necks which project laterally over said side walls, and a cover for said tank or receptacle which is supported by said end walls, substantially as set forth.

2. The combination with a tank or receptacle provided with a bottom, side walls, and end walls which extend upwardly above the tops of said side walls, of battery-plates arranged in said tank or receptacle and provided with necks which project laterally over said side walls, and a cover for said tank or receptacle which is supported by said end walls above and out of contact with the necks of said battery-plates, substantially as set forth.

3. The combination with a tank or receptacle provided with a bottom, side walls, and end walls which extend upwardly above the tops of said side walls, and are provided in the top edges with rabbets, of battery-plates arranged in said tank or receptacle and provided with necks which project laterally over said side walls, and a cover for said tank or receptacle the opposite ends of which rest on said rabbets, substantially as set forth.

4. The combination with a tank or receptacle provided with a battery, side walls, and end walls which extend upwardly above the tops of said side walls, of battery-plates arranged in said tank or receptacle and provided with necks which project laterally over said side walls and are connected by horizontal bars, a cover for said tank supported by said end walls, and filling-strips arranged between the upper edges of said side walls and said connecting-bars, substantially as set forth.

5. The combination with a tank or receptacle provided with a bottom, side walls, and end walls which extend upwardly above the tops of said side walls, of battery-plates arranged in said tank or receptacle and provided with necks which project laterally over said side walls and are connected by horizontal bars, filling-strips arranged between the upper edges of said side walls and said connecting-bars, and end blocks which are arranged at the ends of said connecting-bars and are connected to said filling-strips, substantially as set forth.

6. The combination with two tanks or receptacles each provided with a bottom, side walls, and end walls which extend upwardly above the tops of said side walls, of battery-plates arranged in said tanks or receptacles, a horizontal bar arranged over the adjacent side walls of said tanks or receptacles and connected to battery-plates in each tank, covers for said tanks which are supported by said end walls, and a filling-strip resting on the upper edges of the adjacent side walls of said tanks or receptacles beneath said connecting-bar, substantially as set forth.

Witness my hand this 9th day of August, 1902.

RUFUS N. CHAMBERLAIN.

Witnesses:
 JNO. J. BONNER,
 C. B. HORNBECK.